United States Patent
Riddick et al.

(12) 
(10) Patent No.: US 6,208,782 B1
(45) Date of Patent: Mar. 27, 2001

(54) SEGMENTED REFLECTOR FOR COUPLING AN EXTENDED ILLUMINATION SOURCE TO N FIBER ELEMENTS

(76) Inventors: Kathryn Riddick, 7011 Monte Bella Pl., Franklin, TN (US) 37067; Andrew P. Riser, 14740 Munnberry La., Newbury, OH (US) 44065

(*) Notice: Subject to any disclaimer, the term of this patent is extended or adjusted under 35 U.S.C. 154(b) by 0 days.

(21) Appl. No.: 09/240,281

(22) Filed: Jan. 29, 1999

(51) Int. Cl.[7] .................................................. G02B 6/26
(52) U.S. Cl. ............................ 385/31; 385/47; 385/901; 362/554
(58) Field of Search ................................ 385/31, 47, 119, 385/147, 901; 362/554, 556, 560

(56) References Cited

U.S. PATENT DOCUMENTS

| | | |
|---|---|---|
| 5,317,484 | 5/1994 | Davenport et al. . |
| 5,559,911 | 9/1996 | Forkner et al. . |
| 5,682,448 | 10/1997 | Riser et al. . |
| 5,706,376 | 1/1998 | Rykowski et al. . |
| 5,708,737 | 1/1998 | Riser . |
| 5,751,870 | 5/1998 | Forkner et al. . |
| 5,790,723 | 8/1998 | Riser et al. . |
| 5,790,725 | 8/1998 | Rykowski et al. . |
| 5,832,151 | 11/1998 | Riser et al. . |
| 5,857,041 | 1/1999 | Riser et al. . |
| 5,862,277 | 1/1999 | Riser et al. . |
| 5,892,867 | 4/1999 | Riser et al. . |
| 5,911,020 | 6/1999 | Riser et al. . |

FOREIGN PATENT DOCUMENTS

WO 96/22555    7/1996   (WO) .

OTHER PUBLICATIONS

European Search Report for related application no. 99905557.7 –2317 –US9902002, Sep. 22, 2000.

*Primary Examiner*—James Phan
(74) *Attorney, Agent, or Firm*—Stout, Uxa, Buyan & Mullins, LLP; Donald E Stout

(57) ABSTRACT

An optical fiber illumination system comprises a segmented reflector that efficiently couples energy from a lamp into a plurality of optical fibers. The segmented reflector offers the ability to improve the coupling efficiency by utilizing the cross-sectional area and numerical aperture of more than one optical fiber at the output of a reflector. Also this reduces the energy collected by a single fiber, and can be useful in preventing damage created by the source intensity. In practice, a source lamp is placed along a reflector axis. The reflector is specifically designed for a particular style and type of lamp, and is designed to collect as many rays from that lamp as possible. In a preferred embodiment, the reflector comprises four segments. Each of the four segments forms a distinct focus. In this embodiment, a plurality of lightguides, preferably optical fibers, are placed at the output of the reflector, one each at each focus of the respective reflector segments, with the longitudinal axis of each optical fiber substantially parallel to the axes of the reflector and the lamp. Assuming radial symmetry, each of the four fibers will collect substantially the same amount of light energy, and will transmit this light energy to an end device or user.

10 Claims, 1 Drawing Sheet

SEGMENTED REFLECTOR FOR COUPLING AN EXTENDED ILLUMINATION SOURCE TO N FIBER ELEMENTS

FIELD OF THE INVENTION

The present invention relates to optical lightguide illumination systems, and more particularly to optical lightguide illumination systems employing improved and more efficient technology for capturing light from an extended source and coupling that light into a plurality of lightguides.

BACKGROUND OF THE INVENTION

In optical lightguide illumination systems, such as fiber optic lighting applications, it is often desirable to couple light from an illumination source (typically a single lamp) into a plurality of lightguides, such as optical fibers. This generally increases the coupling efficiency, and prevents damage to the optical fiber by reducing the optical power coupled into any one fiber.

Lamps, particularly high intensity white light sources, are considered to be extended sources (as opposed to point sources), because they have a finite illuminating element, e.g. 1×4 mm. In addition, lamps radiate in all directions (although generally not uniformly). Energy cannot be efficiently coupled into any individual fiber because fiber cross-sectional areas and fiber numerical apertures are generally small than those of a lamp.

SUMMARY OF THE INVENTION

The present invention resolves the difficulties discussed supra, by providing a segmented reflector that efficiently couples energy from a lamp into a plurality of optical fibers. A segmented reflector offers the ability to improve the coupling efficiency by utilizing the cross-sectional area and numerical aperture of more than one optical fiber at the output of a reflector. Also this reduces the energy collected by a single fiber, and can be useful in preventing damage created by the source intensity.

More particularly, in one embodiment of the invention a source lamp is placed along a reflector axis. The reflector is specifically designed for a particular style and type of lamp, and is designed to collect as many rays from that lamp as possible. In a preferred embodiment, the reflector comprises four segments. Each of the four segments forms a distinct focus. In this embodiment, a plurality of lightguides, preferably optical fibers, are placed at the output of the reflector, one each at each focus of the respective reflector segments, with the longitudinal axis of each optical fiber substantially parallel to the axes of the reflector and the lamp. Assuming radial symmetry, each of the four fibers will collect substantially the same amount of light energy, and will transmit this light energy to an end device or user.

In one aspect of the invention, there is provided an illumination system comprising an illumination source, a reflector disposed adjacent to the illumination source, wherein the reflector is comprised of a plurality of segments, and a plurality of lightguides having receiving ends for receiving light distributed from different corresponding ones of the plurality of reflector segments. Preferably, the lightguides comprise optical fibers, and there is a one-to-one correspondence of reflector segments to lightguides. In the preferred embodiment, the reflector is divided into pie-shaped segments.

In another aspect of the invention, there is provided an illumination system comprising an extended illumination source having a length, a reflector disposed adjacent to the extended illumination source, wherein the reflector is comprised of a plurality of segments and has an axis, and a plurality of lightguides having receiving ends for receiving light distributed from different corresponding ones of the plurality of reflector segments, wherein the length of the extended illumination source lies substantially along the reflector axis.

In still another aspect of the invention, there is provided a method of fabricating a segmented illumination reflector of an illumination system having an extended illumination source, wherein the segmented reflector comprises a plurality of reflector segments and the illumination system includes a plurality of lightguides having receiving ends for receiving light distributed from different corresponding ones of the plurality of reflector segments. This method comprises an initial step of mapping the radiation patterns of the extended illumination source. Then, a database of the radiation patterns emitted by the extended illumination source is created. Once the database has been created, it is used to generate a configuration for the segmented reflector which provides an optimal distribution and intensity of illumination at the receiving end of each of the lightguides.

The invention, together with additional features and advantages thereof, may best be understood by reference to the following description taken in conjunction with the accompanying illustrative drawing.

DESCRIPTION OF THE PREFERRED EMBODIMENT

Figure 1:
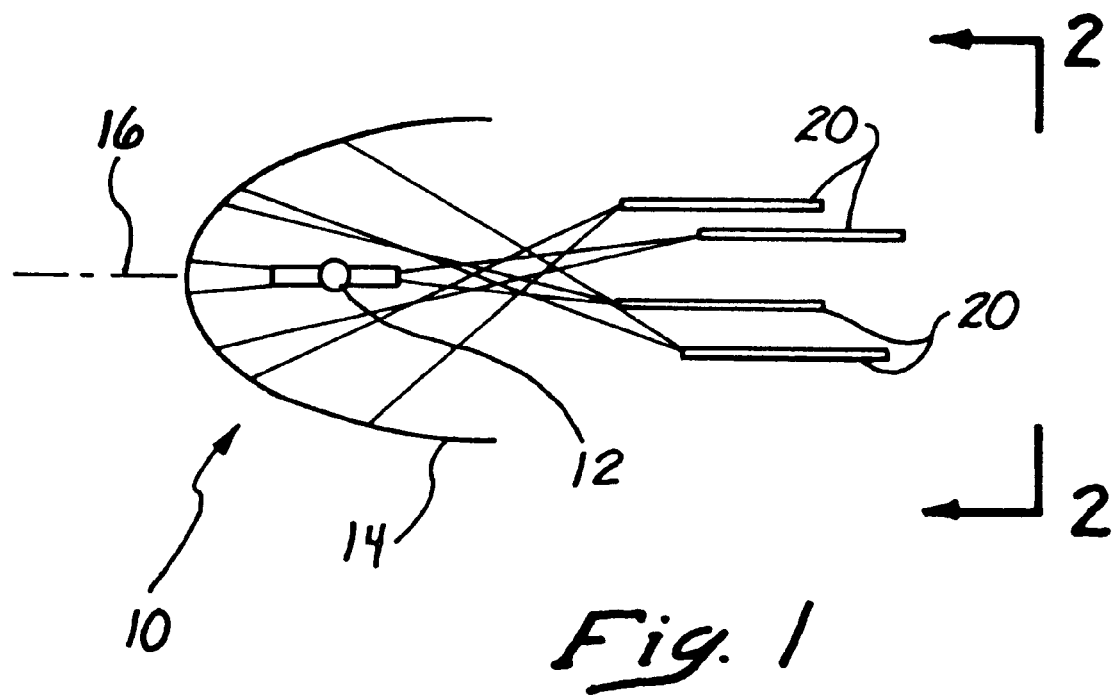
FIG. 1 is a schematic diagram illustrating an illumination system constructed in accordance with the principles of the invention.

With reference now particularly to the drawing figures, an optical lightguide illumination system 10 is shown which is comprised of an extended illumination source 12. The illumination source 12 may be any known lamp having a relatively high intensity output. A segmented reflector 14, having an axis 16, is disposed about the illumination source 12 in such a manner that the extended dimension, typically its length, of the extended light source 12 lies along the axis of the reflector 14, as shown in FIG. 1.

Figure 2:
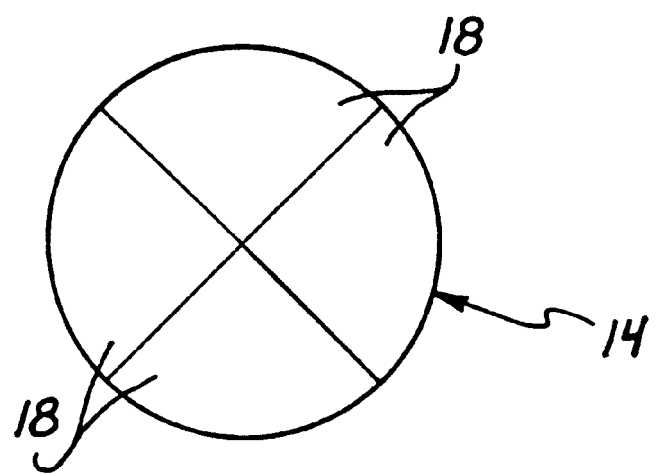
FIG. 2 is a schematic front view of a perferred segmented reflector constructed in accordance with the principles of the invention.

As illustrated in FIG. 2, the segmented reflector 14 comprises a plurality of segments 18. In the preferred embodiment, four segments 18 are shown, but it could practically be designed with as few as two segments or as many as twelve or more segments, if desired. An important feature of the invention is that each of the reflector segments 18 is configured to focus light emitted from the lamp 12 onto a corresponding one of an output light guide or optical fiber 20, as illustrated in FIG. 1.

By analyzing millions of rays of lights from a particular lamp, it is possible to map the complex radiation patterns of that lamp, which means to collect spatial intensity distribution measurements at a constant radial distance from the lamp using a calibrated imaging detector array, as described in U.S. patent application Ser. No. 08/599,970, now allowed and herein expressly incorporated by reference. Once the mapping process is complete, computer software is used to play the file containing the lamp's complex three-space emission pattern against the surface of any arbitrarily defined reflector surface, thereby yielding a highly accurate prediction of exactly what the resulting radiation product will look like at any point in space. Using this process, fully described in the aforementioned '970 application, the precise reflector element shape required to collect and focus as many rays as possible from a particular lamp style and to type those rays onto output lightguides may be calculated. Then, reflectors constructed in accordance with these designs may be readily produced using current molding techniques. Once molded, a metallic metal finish may be deposited on the reflector.

While this invention has been described with respect to various specific examples and embodiments, it is to be understood that the invention is not limited thereto and that it can be variously practiced within the scope of the following claims.

What is claimed is:

1. An illumination system comprising:

an extended illumination source, said extended illumination source having a longer dimension and a shorter dimension;

a reflector disposed adjacent to said extended illumination source, said reflector being comprised of a plurality of segments and including an axis; and a plurality of lightguides having receiving ends for receiving light distributed from different corresponding ones of said plurality of reflector segments;

wherein said extended illumination source is disposed so that its longer dimension lies substantially along said reflector axis.

2. The illumination system as recited in claim 1, wherein there is a one-to-one correspondence of reflector segments to lightguides.

3. The illumination system as recited in claim 1, wherein said plurality of lightguides comprise optical fibers.

4. The illumination system as recited in claim 1, wherein said reflector is divided into pie-shaped segments.

5. The illumination system as recited in claim 1, wherein said reflector is made via a locus of mapped radiation patterns of the illumination source which are created using a database of the radiation patterns emitted by the illumination source in order to provide optimal distribution and intensity of illumination.

6. An illumination system comprising:

an extended illumination source having a length;

a reflector disposed adjacent to said extended illumination source, said reflector being comprised of a plurality of segments and having an axis; and a plurality of lightguides having receiving ends for receiving light distributed from different corresponding ones of said plurality of reflector segments;

wherein the length of said extended illumination source lies substantially along said reflector axis.

7. The illumination system as recited in claim 6, wherein there is a one-to-one correspondence of reflector segments to lightguides.

8. The illumination system as recited in claim 6, wherein said plurality of lightguides comprise optical fibers.

9. The illumination system as recited in claim 6, wherein said reflector is divided into pie-shaped segments.

10. A method of fabricating a segmented illumination reflector of an illumination system having an extended illumination source, the segmented reflector comprising a plurality of reflector segment and having an axis, the extended illumination source having a shorter dimension and a longer dimension, and the illumination system including a plurality of lightguides having receiving ends for receiving light distributed from different corresponding ones of said plurality of reflector segments, the method comprising:

mapping the radiation patterns of the extended illumination source;

creating a database of the radiation patterns emitted by the extended illumination source; and using the database to generate a configuration for the segmented reflector which provides an optimal distribution and intensity of illumination ax the receiving end of each of the lightguides when the longer dimension of said extended illumination source is oriented alone said reflector axis.

* * * * *

UNITED STATES PATENT AND TRADEMARK OFFICE
CERTIFICATE OF CORRECTION

PATENT NO. : 6,208,782 B1
DATED : March 27, 2001
INVENTOR(S) : Riddick et al.

It is certified that error appears in the above-identified patent and that said Letters Patent is hereby corrected as shown below:

Column 1,
Line 28, "small" should be -- smaller --.

Column 4,
Line 24, "segment" should be -- segments --.
Line 38, "ax" should be -- at --.
Line 41, "alone" should be -- along --.

Signed and Sealed this

Fourteenth Day of January, 2003

JAMES E. ROGAN
*Director of the United States Patent and Trademark Office*